US008295986B2

(12) United States Patent
Vaidyanathan

(10) Patent No.: US 8,295,986 B2
(45) Date of Patent: Oct. 23, 2012

(54) NET METERING APPARATUS FOR POWER GENERATION SYSTEMS

(76) Inventor: Chandramouli Vaidyanathan, Eagan, MN (US)

(*) Notice: Subject to any disclaimer, the term of this patent is extended or adjusted under 35 U.S.C. 154(b) by 586 days.

(21) Appl. No.: 12/568,601

(22) Filed: Sep. 28, 2009

(65) Prior Publication Data

US 2011/0077786 A1    Mar. 31, 2011

(51) Int. Cl.
*G05D 11/00* (2006.01)
(52) U.S. Cl. .......... 700/286; 700/297; 705/412
(58) Field of Classification Search .......... 700/286, 700/297; 705/412
See application file for complete search history.

(56) References Cited

U.S. PATENT DOCUMENTS

| 7,941,677 | B2 * | 5/2011 | Penning | 713/300 |
| 2002/0029097 | A1 * | 3/2002 | Pionzio et al. | 700/286 |
| 2003/0144864 | A1 * | 7/2003 | Mazzarella | 705/1 |
| 2004/0158360 | A1 * | 8/2004 | Garland et al. | 700/286 |
| 2006/0194082 | A1 * | 8/2006 | Tucker et al. | 429/9 |
| 2007/0055408 | A1 * | 3/2007 | Delmerico et al. | 700/286 |
| 2008/0112807 | A1 * | 5/2008 | Uphues et al. | 416/1 |
| 2008/0272934 | A1 * | 11/2008 | Wang et al. | 340/870.11 |
| 2011/0040666 | A1 * | 2/2011 | Crabtree et al. | 705/37 |

* cited by examiner

*Primary Examiner* — Mohammad Ali
*Assistant Examiner* — Anthony Whittington
(74) *Attorney, Agent, or Firm* — Benjamin C. Armitage; Clise, Billion & Cyr, P.A.

(57) ABSTRACT

An electrical power generation unit including a power source, an energy storage system and a net metering control apparatus capable of controlling power delivered to an electrical utility grid so that that a total amount of electrical power from the power source and the energy storage system does not exceed a prescribed power limit. A process of controlling electrical power flow in an electrical power generation unit connected to an electrical utility grid so that that a total amount of electrical power from the power source and the energy storage system does not exceed a prescribed power limit.

14 Claims, 1 Drawing Sheet

NET METERING APPARATUS FOR POWER GENERATION SYSTEMS

FIELD OF THE INVENTION

This invention is directed to electrical power generation systems connected to an electric utility grid.

BACKGROUND OF THE INVENTION

Electrical power generation units, for example renewable energy systems such as solar or wind energy systems, may be connected to an electrical utility grid, and may provide power to the utility grid. It is common for utility companies which own or operate the utility grid to purchase power from the power generation units up to a prescribed power limit, for example 40 kilowatts. The power generation units, especially solar or wind energy systems, may exhibit large variations in power output with respect to the prescribed power limit, so that power output excursions above the prescribed limit are unprofitable.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

An electrical power generation unit which is connected to an electrical utility grid may be coupled to an energy storage system and a net metering apparatus. During periods in which power generated by the power generation unit exceeds a desired or legal power limit, herein referred to as the prescribed power limit, the net metering apparatus may direct power from the power generation unit to the utility grid up to the prescribed power limit, and may direct excess energy to the storage system. During periods in which power generated by the power generation unit is less than the prescribed power limit, the net metering apparatus may direct power from the storage system to the utility grid, by a process such that a sum of the power from the power generation unit and the power from the storage system does not exceed the prescribed power limit.

DETAILED DESCRIPTION

Figure 1:
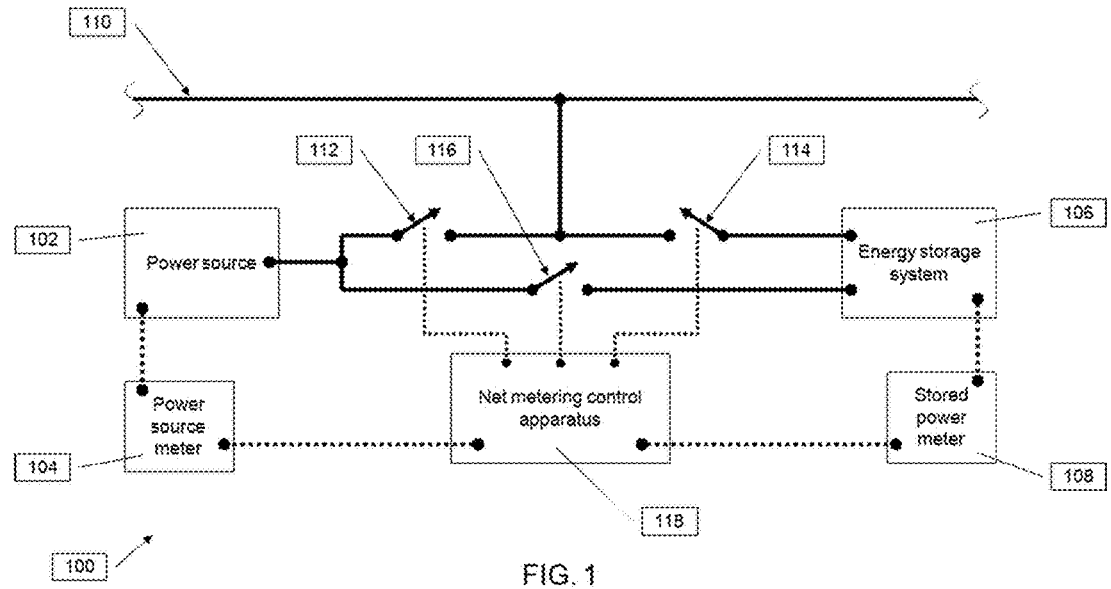
FIG. 1 depicts an electrical power generation unit 100 formed according to an embodiment.

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

FIG. 1 depicts an electrical power generation unit 100 formed according to an embodiment. The electrical power generation unit 100 includes a power source 102, for example one or more solar photovoltaic panels, and/or one or more wind turbines, capable of generating electrical power. A means for measuring the electrical power being generated by the power source 102, depicted schematically in FIG. 1 as power source meter 104, is coupled to the power source 102. In one realization of the instant embodiment, the power source meter 104 may be electromagnetically coupled to the power source 102, for example through an air core transformer.

The electrical power generation unit 100 also includes an energy storage system 106, for example a rechargeable battery, a flywheel, and/or a closed cycle fuel cell, capable of storing electrical power delivered to the energy storage system 106 as stored energy. The energy storage system 106 is furthermore capable of delivering the stored energy in the form of electrical power. In one realization of the instant embodiment, the energy storage system 106 may have a maximum capacity for the stored energy. In one realization of the instant embodiment, the energy storage system 106 is capable of delivering a desired amount of electrical power up to a stored energy delivery rate limit. A means for measuring an amount of the stored energy in the energy storage system 106, depicted schematically in FIG. 1 as stored power meter 108, is coupled to the energy storage system 106.

Electrical power may be delivered from the power source 102 to an electrical utility grid 110, depicted schematically in FIG. 1 as electrical utility conductor 110, through a generated power delivery switch 112. The generated power delivery switch 112 is capable of controlling an amount of electrical power from the power source 102 delivered to the electrical utility grid 110. In one realization of the instant embodiment, the generated power delivery switch 112 may be capable of limiting the electrical power delivered to the electrical utility grid 110 to a desired fraction of the power generated by the power source 102. Electrical power may be delivered from the energy storage system 106 to the electrical utility grid 110 through a stored energy delivery switch 114. The stored energy delivery switch 114 is capable of controlling an amount of electrical power from the energy storage system 106 delivered to the electrical utility grid 110. In one realization of the instant embodiment, the stored energy delivery switch 114 may be capable of limiting the electrical power delivered to the electrical utility grid 110 to a desired fraction of the electrical power produced by the energy storage system 106. Electrical power may be delivered from the power source 102 to the energy storage system 106 through a transfer switch 116. The transfer switch 116 is capable of controlling an amount of electrical power from the power source 102 delivered to the energy storage system 106. In one realization of the instant embodiment, the transfer switch 116 may be capable of limiting the electrical power delivered to the energy storage system 106 to a desired fraction of the power generated by the power source 102.

The electrical power generation unit 100 further includes a net metering control apparatus 118. The net metering control apparatus 118 is coupled to the power source meter 104, and is capable of reading a value of the power source meter 104 representative of the amount of power being generated by the power source 102. Similarly, the net metering control apparatus 118 is coupled to the stored power meter 108, and is capable of reading a value of the stored power meter 108 representative of the energy stored in the energy storage system 106. In one realization of the instant embodiment, the net metering control apparatus 118 may be wirelessly coupled to the source meter 104 and/or the stored power meter 108. The net metering control apparatus 118 is further coupled to the generated power delivery switch 112, the stored energy delivery switch 114 and the transfer switch 116, and is configured to independently control the generated power delivery switch 112, the stored energy delivery switch 114 and the transfer switch 116. The net metering control apparatus 118 is capable of adjusting the generated power delivery switch 112, the stored energy delivery switch 114 and the transfer switch 116 based on the values read from the power source meter 104 and the stored power meter 108 so that a total amount of electrical power from the power source 102 and the energy storage system 106 to the electrical utility grid 110 does not exceed a prescribed power limit. in one realization of the instant embodiment, the net metering control apparatus 118 is capable of adjusting the transfer switch 116 so that power generated by the power source 102 above the prescribed power limit may be delivered to the energy storage system 106. The net metering control apparatus 118 may incorporate a computer or other electronic controller.

Figure 2:
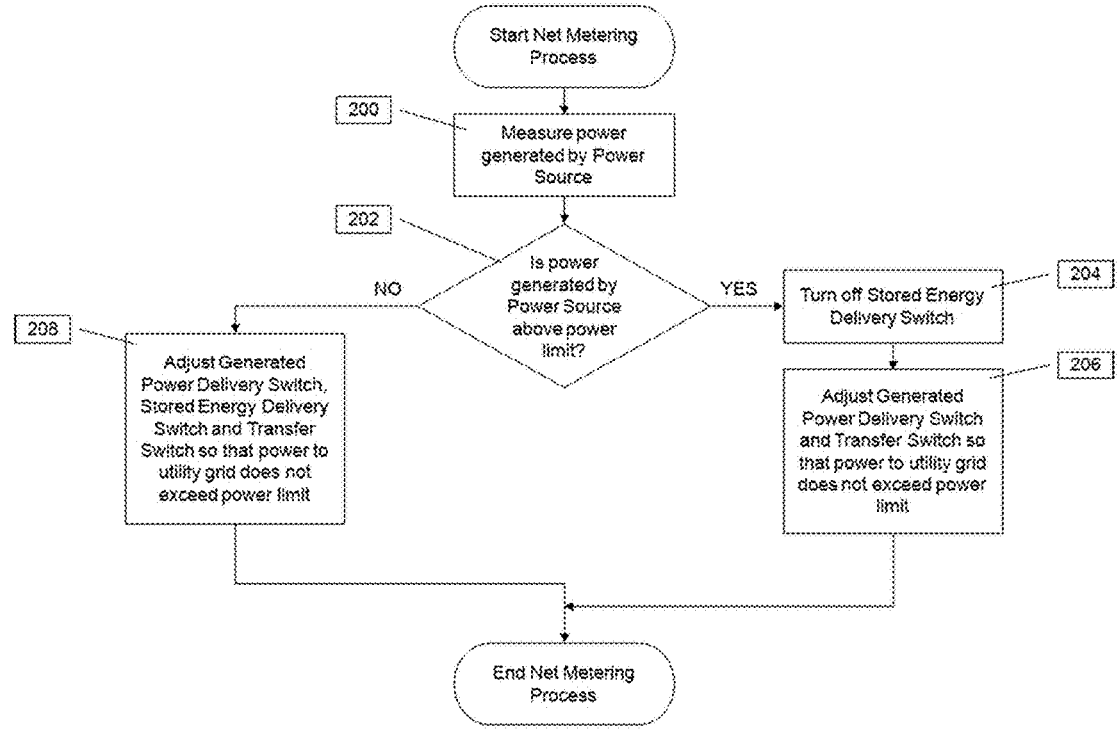
FIG. 2 is flowchart of a net metering process for controlling electrical power flow in an electrical power generation unit as described in reference to FIG. 1.

FIG. 2 is flowchart of a net metering process for controlling electrical power flow in an electrical power generation unit as described in reference to FIG. 1. The net metering process begins with step 200, which is the net metering control apparatus 118 to read the power source meter 104 to obtain a value representative of the amount of electrical power being generated by the power source 102. Subsequently, step 202 is executed, which is to determine if the amount of power being generated by the power source 102 is above the prescribed power limit. In one realization of the instant embodiment, there may exist a lower reimbursement rate for electrical power delivered to the electrical utility grid 110 above the prescribed power limit compared to power delivered below the prescribed limit.

If the result of step 202 is yes, step 204 is executed, which is the net metering control apparatus 118 to turn off the stored energy delivery switch 114 if it is in an on state. If the stored energy delivery switch 114 is already in an off state, execution of step 204 entails maintaining the stored energy delivery switch 114 in the off state.

Step 206 is executed, which is the net metering control apparatus 118 to adjust the generated power delivery switch 112 and the transfer switch 116 so that power delivered to the electrical utility grid 110 does not exceed the prescribed power limit. In one realization of the instant embodiment, execution of step 206 may include adjusting the transfer switch 116 so that power from the power source 102 above the prescribed power limit is delivered to the energy storage system 106. In alternate realizations of the instant embodiment, steps 204 and 206 may be executed in any order.

If the result of step 202 is no, step 208 is executed, which is the net metering control apparatus 118 to adjust the generated power delivery switch 112, the stored energy delivery switch 114 and the transfer switch 116 so that total power from the power source 102 and the energy storage system 106 delivered to the electrical utility grid 110 does not exceed the prescribed power limit. In one realization of the instant embodiment, execution of step 208 may include turning off the transfer switch 116.

After step 206 or step 208 is executed, the net metering process is ended. the net metering process may be repeated as frequently as desired to obtain a desired level of performance from the electrical power generation unit 100.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

REFERENCES CITED

U.S. Patent Documents

| 7,590,472 | Sep. 15, 2009 | Hakim |
| 7,512,540 | Mar. 31, 2009 | Gluck |
| 7,516,106 | Apr. 7, 2009 | Ehlers |
| 7,444,189 | Oct. 28, 2008 | Marhoefer |
| 7,430,459 | Sep. 30, 2008 | Papalia |
| 7,418,428 | Aug. 26, 2008 | Ehlers |
| 7,379,997 | May 27, 2008 | Ehlers |
| 7,352,076 | Apr. 1, 2008 | Gabrys |
| 7,141,321 | Nov. 28, 2006 | McArthur |
| 6,978,931 | Dec. 27, 2005 | Brobeck |
| 6,255,805 | Jul. 3, 2001 | Papalia |

What is claimed is:

1. An electrical power generation unit, comprising:
a power source, said power source for generating electrical power;
a metering device for measuring electrical power being generated by said power source, coupled to said power source; a generated power delivery switch connected to said power source, for controlling an amount of said electrical power generated by said power source delivered to an electrical utility grid; an energy storage system connected to said power source through a transfer switch, said energy storage system for storing electrical power as stored energy and delivering said stored energy as electrical power, and said transfer switch for controlling an amount of said electrical power generated by said power source delivered to said energy storage system; a metering device for measuring an amount of said stored energy in said energy storage system, coupled to said energy storage system; a stored energy delivery switch connected to said energy storage system, for controlling an amount of said electrical power delivered by said energy storage system delivered to said electrical utility grid; and
a net metering control apparatus coupled to said metering device for measuring electrical power being generated by said power source, to said metering device for measuring said stored energy in said energy storage system, to said generated power delivery switch, to said stored energy delivery switch and to said transfer switch, said net metering control apparatus configured for being reading a value of said power source meter, reading a value of said stored power meter, and controlling said generated power delivery switch, said stored energy delivery switch and said transfer switch, so that that a total amount of electrical power from said power source and said energy storage system does not exceed a prescribed power limit.

2. The electrical power generation unit of claim 1, in which said net metering control apparatus is further configured to adjust said transfer switch so that said electrical power generated by said power source above said prescribed power limit is delivered to said energy storage system.

3. The electrical power generation unit of claim 1, in which said power source includes solar photovoltaic panels.

4. The electrical power generation unit of claim 1, in which said power source includes wind turbines.

5. The electrical power generation unit of claim 1, in which said energy storage system includes a rechargeable battery.

6. The electrical power generation unit of claim 1, in which said energy storage system includes a closed cycle fuel cell.

7. The electrical power generation unit of claim 1, in which said energy storage system includes a flywheel.

8. A process of controlling electrical power flow in an electrical power generation unit connected to an electrical utility grid, comprising:
   reading a power source meter to obtain a value representative of an amount of electrical power being generated by a power source contained in said electrical power generation unit;
   determining if said electrical power being generated by said power source is above a prescribed power limit to be delivered to said electrical utility grid;
   if a result of said step of determining if said electrical power being generated by said power source is above said prescribed power limit is no, then adjusting a power delivery switch connecting said power source to said electrical utility grid, adjusting a stored energy switch connecting an energy storage system to said electrical utility grid, and adjusting a transfer switch connecting said power source to said energy storage system so that a total power from said power source and said energy storage system delivered to said electrical utility grid does not exceed said prescribed power limit; and
   if said result of said step of determining if said electrical power being generated by said power source is above said prescribed power limit is yes, then:
      turning off said stored energy switch; and
      adjusting said power delivery switch and adjusting said transfer switch so that said total power from said power source and said energy storage system delivered to said electrical utility grid does not exceed said prescribed power limit.

9. The process of claim 8, in which said step of adjusting said power delivery switch and adjusting said transfer switch further includes adjusting said transfer switch so that said electrical power generated by said power source above said prescribed power limit is delivered to said energy storage system.

10. The process of claim 8, in which said power source includes solar photovoltaic panels.

11. The process of claim 8, in which said power source includes wind turbines.

12. The process of claim 8, in which said energy storage system includes a rechargeable battery.

13. The process of claim 8, in which said energy storage system includes a closed cycle fuel cell.

14. The process of claim 8, in which said energy storage system includes a flywheel.

* * * * *